(12) United States Patent
Lee et al.

(10) Patent No.: US 6,842,253 B2
(45) Date of Patent: Jan. 11, 2005

(54) CONSTRUCTING METHOD FOR AN OPTICAL PASSIVE COMPONENT

(75) Inventors: San-Liang Lee, Taipei (TW); Yen-Juei Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 55 days.

(21) Appl. No.: 10/442,082

(22) Filed: May 21, 2003

(65) Prior Publication Data

US 2004/0202425 A1 Oct. 14, 2004

(30) Foreign Application Priority Data

Apr. 8, 2003 (TW) ........................................ 92107970 A

(51) Int. Cl.⁷ ............................ G01B 9/02; G02B 6/26
(52) U.S. Cl. ............................ 356/477; 385/27; 398/82
(58) Field of Search ................................ 356/477–483; 398/68–97; 385/27–31

(56) References Cited

U.S. PATENT DOCUMENTS 6,445,477 B1 * 9/2002 Madsen et al. ............. 398/192
6,587,616 B1 * 7/2003 Augustsson ................. 385/24
6,614,213 B1 * 9/2003 Whitbread et al. ........... 324/72

* cited by examiner

Primary Examiner—Akm Enayet Ullah
Assistant Examiner—Jerry T Rahll
(74) Attorney, Agent, or Firm—Rosenberg, Klein & Lee

(57) ABSTRACT

The present invention relates to a constructing method and device for an optical passive component by using an improved structure of a Mach-Zehnder interferometer. This improved structure of the Mach-Zehnder interferometer is composed of two MMI beam splitters, a curved channel waveguide and a periodic segment waveguide for being separately used as the beam-splitting components, the curved arm and the straight arm of the Mach-Zehnder interferometer. In the inventive MMI beam splitter, a sub-area in the MMI waveguide is a periodic segment waveguide having a plurality of segments. By adjusting the number of the segments of the periodic segment waveguide in the MMI waveguide, the beam-splitting ratio of the MMI beam splitter can be arbitrarily adjusted. By adjusting the segment period and the duty cycle of the straight arm of the Mach-Zehnder interferometer, the required length of the straight arm can be efficiently shortened.

18 Claims, 6 Drawing Sheets

CONSTRUCTING METHOD FOR AN OPTICAL PASSIVE COMPONENT

BACKGROUND OF THE INVENTION

1. Field of the Invention

The present invention relates to a planar-lightwave-circuit (PLC) technology for an optical communication component, and particularly, to a constructing method and device for an optical passive component by using an improved structure of a Mach-Zehnder interferometer.

2. Description of the Prior Art

As the information technology develops vigorously and the applications to the Internet grow rapidly, it is a must to employ the optical network having the optical fiber as the transmission medium. The specification of 10-Gbps Ethernet (10GbE) has been enacted in 2002, and the coarse wavelength division multiplexer (CWDM) is very suitable to be employed in the physical layer. Current CWDM demultiplexers (Demux) are usually made of thin film filters (TFFs) that require elaborate packaging and large module size. To reduce cost and improve reliability, an integrated PLC solution will be beneficial and can be mass-produced. Cascading directional couplers can realize the Demux, but the relatively long device limits the number of channels. To overcome this problem, the Demux using the Mach-Zehnder-interference (MZI) principle was proposed. Recently, much attention is paid to the materials of silicon-on-insulator (SOI) and silica because these materials can be low cost and exhibit <0.1 dB/cm of propagation loss in the infrared (1.3–1.55 $\mu$m) regime. However, the difference in the effective refractive index of the waveguide is relatively small, and the manufactured Mach-Zehnder interferometer will have an excessive size and bending loss problem.

In conventional design, the directional coupler is employed in the beam-splitting component for constructing the Mach-Zehnder interferometer. Although this can realize the arbitrary output of the beam-splitting ratio, the gap between the waveguides will seriously affect the output characteristics of the component. It is hard to control the gap in the manufacture process, and therefore, the yield will be greatly reduced. Because some materials for the waveguides have smaller difference of effective refractive index ($\Delta n$) so that the length difference between the two arms of the Mach-Zehnder interferometer has to be very great so as to achieve the required function of wavelength filtering. The common solution is to increase the bending radius of the curved arm. However, this will cause the bending loss, and in order to reduce the bending loss, the length of the straight arm has to be increased.

SUMMARY OF THE INVENTION

The main object of the present invention is to provide an improved structure of a Mach-Zehnder interferometer composed of a multimode interference (MMI) beam splitter and a periodic segment waveguide (PSW) so as to shorten the size of the component, to reduce the bending loss and increase the tolerance of the manufacture error no matter what kind of material is employed.

The secondary object of the present invention is to provide an improved structure where a periodic segment waveguide is embedded into a single MMI waveguide. Because the difference of the effective refractive index of a partial area is changed, the light propagation phase will be changed and the beam-splitting ratio of the optical output will also be changed so as to increase the tolerance of the manufacture process.

Another object of the present invention is to provide an improved structure where a periodic segment waveguide is used for replacing the straight arm so as to cause the asymmetry of the effective refractive index of the two arms so that the length difference of the two arms of the Mach-Zehnder interferometer is not required to be great and the function of the wavelength filtering still can be achieved so as to reduce the bending loss and shorten the length of the component.

Another object of the present invention is to provide a constructing method for an optical passive component by using an improved structure of a Mach-Zehnder interferometer so as to resolve the problem that when the SOI and silica are used for being the optical waveguide, the manufactured Mach-Zehnder interferometer will have an excessive size and the bending loss because of the smaller difference of the effective refractive index of the waveguide.

The present invention provides a constructing method for an optical passive component by using an improved structure of a Mach-Zehnder interferometer. This improved structure of the Mach-Zehnder interferometer is composed of two MMI beam splitters, a curved channel waveguide and a periodic segment waveguide for being separately used as the beam-splitting components, the curved arm and the straight arm of the Mach-Zehnder interferometer. In the inventive MMI beam splitter, a sub-area in the MMI waveguide is a periodic segment waveguide having a plurality of segments. By adjusting the number of the segments of the periodic segment waveguide in the MMI waveguide, the beam-splitting ratio of the MMI beam splitter can be arbitrarily adjusted. By adjusting the segment period and the duty cycle of the straight arm of the Mach-Zehnder interferometer, the required length of the straight arm can be efficiently shortened.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENT

In the present invention, it is proposed to use a periodic segment waveguide 10 for constructing an arbitrary ratio MMI beam splitter 30 and a two port Mach-Zehnder interferometer 50, and then base on these two devices to make up an optical passive component.

Figure 1:
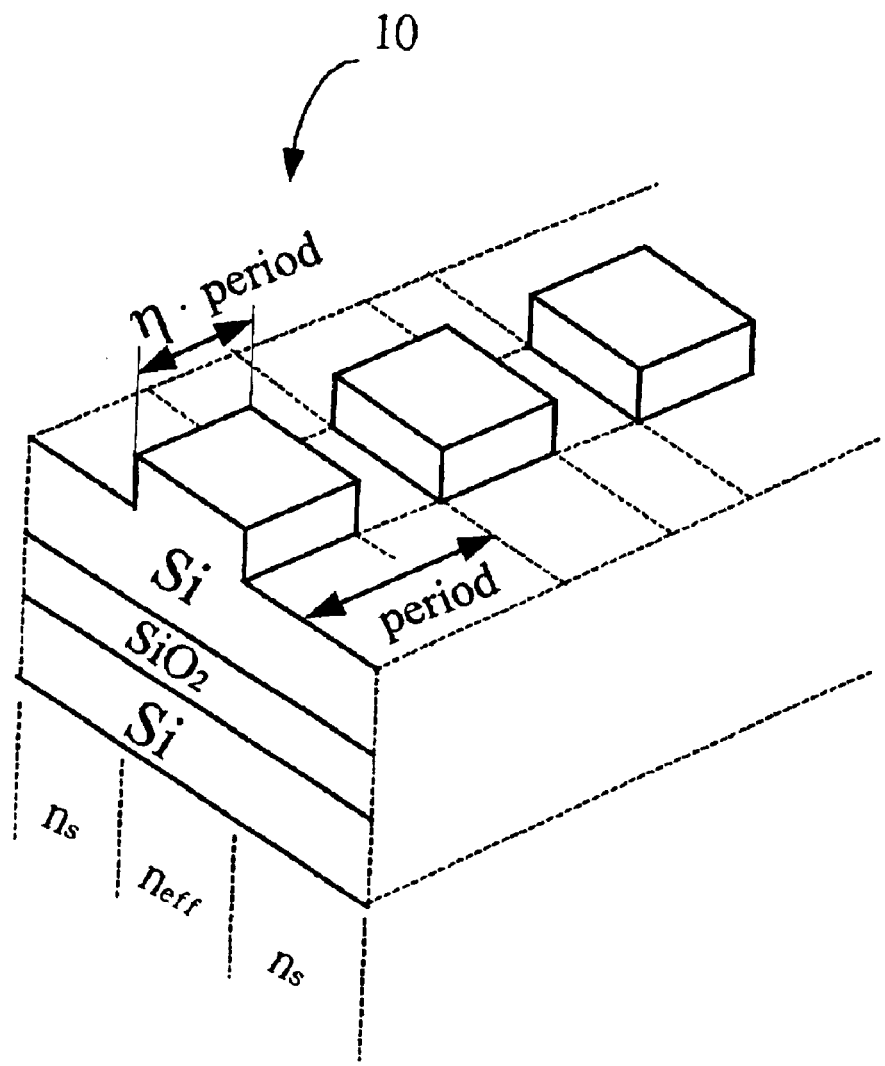
FIG. 1 is a perspective diagram of a periodic segment waveguide according to the present invention.

Please refer to FIG. 1. FIG. 1 is a perspective diagram of a periodic segment waveguide according to the present invention. Based on the theory, the periodic segment waveguide 10 can be equivalently viewed as a continuous channel waveguide having a sectional plane with the same height and width, and the difference of the effective refractive index of the continuous channel waveguide is $\eta \times \Delta n$. Wherein $\eta$ is the duty cycle of the periodic segment waveguide, and $\Delta n$ is the difference of the effective refractive index of the ridge waveguide. By using this technology, it is only required to employ one optical mask photolithography process for manufacturing many optical waveguides with different refractive indices on a plane so as to simplify the process and reduce the cost.

Figure 2:
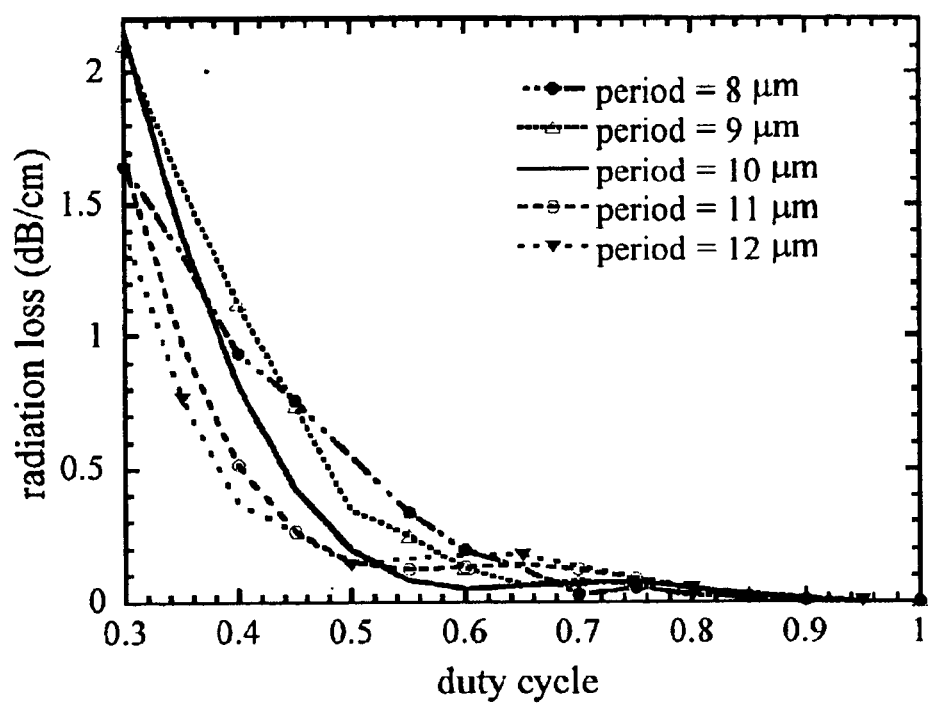
FIG. 2 is a statistic diagram showing how the variations of the duty cycle and the period of the inventive segment waveguide affect the radiation loss.

A beam propagation method (BPM) is used for analyzing and quantifying the loss of the segment waveguide. Take the material of SOI for example, the relation of the radiation loss and the period and the duty cycle is shown in FIG. 2. FIG. 2 is a statistic diagram showing how the variations of the duty cycle and the period of the inventive segment waveguide affect the radiation loss. The loss of the periodic segment waveguide can be very low (less than 0.2 dB in each centimeter), as long as the duty cycle is designed to be greater than 0.5, and the period is designed to be greater than or equal to 10 $\mu$m. The optimal value is selected so that the duty cycle is equal to 0.6 and the period is equal to 10 $\mu$m. Therefore, the loss is minimized and the asymmetry of the effective refractive index is maximized.

Figure 3:
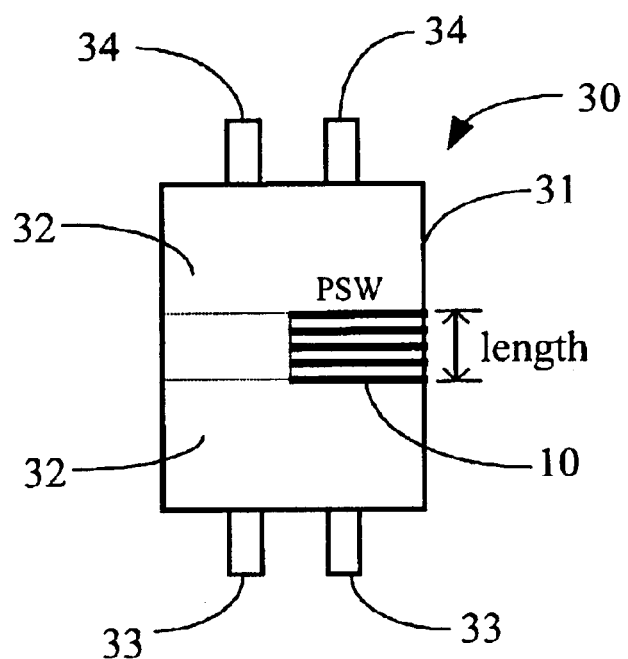
FIG. 3 is a perspective diagram of a MMI beam splitter according to the present invention.

Please refer to FIG. 3. FIG. 3 is a perspective diagram of a MMI beam splitter according to the present invention. It is assured that the MMI waveguide 31 can improve the tolerance and have a small size. In addition, it is insensitive to the variation and polarization of the wavelength of the incident light. Therefore, according to the mentioned characteristics, the arbitrary ratio MMI beam splitter 30 is designed. The MMI beam splitter 30 comprises a MMI waveguide 31 representing a MMI waveguide mother-area and a free propagation area 32 representing a MMI waveguide sub-area. The MMI waveguide 31 is divided into three areas. The first and the third areas are the free propagation area 32, and a periodic segment waveguide 10 is embedded into the second area. Because the difference of the effective refractive index of a partial area is changed, the light-propagating phase is changed so as to change the beam-splitting ratio of the light output. The number of the segments is set as M. Take the SOI for example, the period of the segment waveguide is designed as 5 $\mu$m, and the duty cycle is 0.6.

Figure 4:
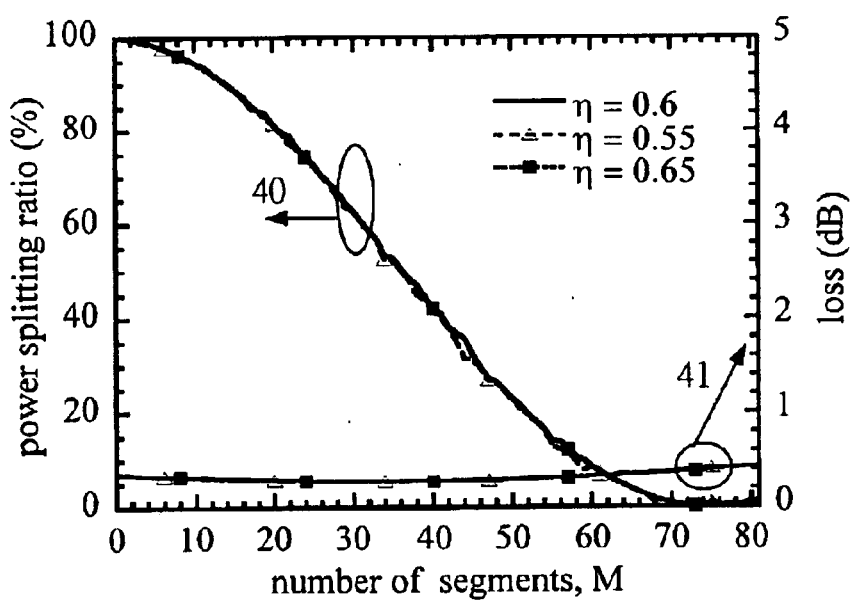
FIG. 4 is a statistic diagram showing how the variations of the number of the segments and the duty cycle affect the beam-splitting ratio and the loss.

FIG. 4 shows the relation of the beam-splitting ratio and the access loss of the arbitrary ratio MMI beam splitter to the number of the segments. There are two simulated modem lines, a power beam-splitting ratio modem line 40 and a loss modem line 41 in the figure. We choose M=26 to produce 70% coupler, and M=59 for 10% coupler. The access loss can be less than 0.3 dB. As shown in FIG. 4, even when the duty cycle of the segment waveguide is slightly varied because of the fabrication error, the mentioned beam-splitting characteristic can remain stable.

Figure 5:
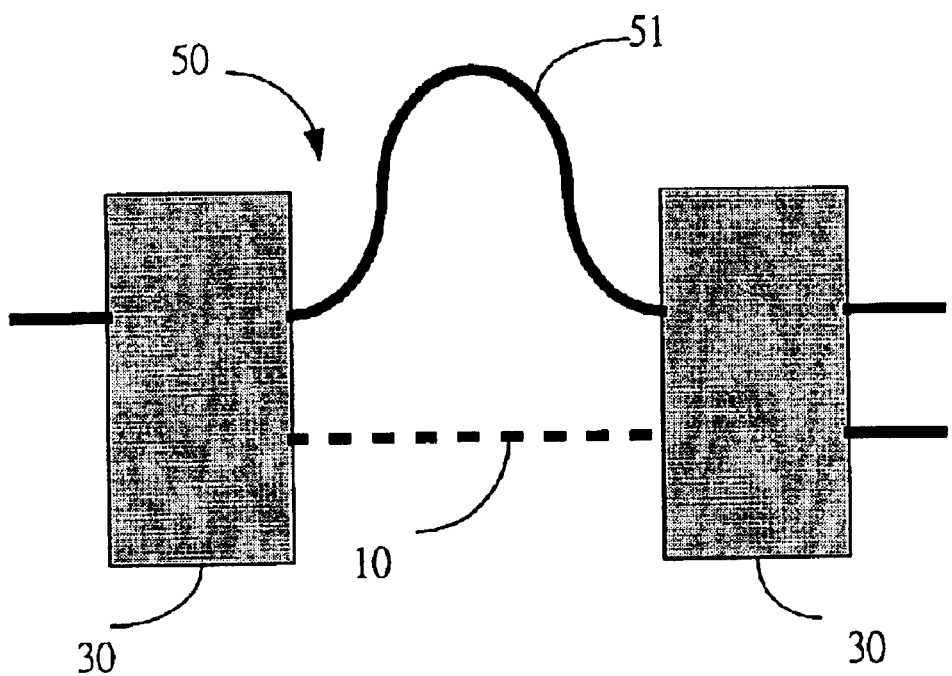
FIG. 5 is a perspective diagram of a two port Mach-Zehnder interferometer according to the present invention.

FIG. 5 is a perspective diagram of a two port Mach-Zehnder interferometer according to the present invention. In a two port Mach-Zehnder interferometer 50, the relation of the variation of the wavelength and the incident light power and the output light power is shown as follows:

$$P_{O1}=P_1 \sin^2(\pi n_{eff}\Delta L/\lambda_0)+P_2 \cos^2(\pi n_{eff}\Delta L/\lambda_0), \quad (1)$$

$$P_{O2}=P_1 \cos^2(\pi n_{eff}\Delta L/\lambda_0)+P_2 \sin^2(\pi n_{eff}\Delta L/\lambda_0), \quad (2)$$

Wherein $P_{O1}$ and $P_{O2}$ are output light powers, and $P_1$ and $P_2$ are the incident light powers of the port 1 and port 2, respectively. The $n_{eff}$ is the effective refractive index of the ridge waveguide. $\Delta L$ is the length difference of two arms of the Mach-Zehnder interferometer. Based on the theory of the Mach-Zehnder interferometer, it is known that the wavelength separation $\Delta \lambda$ between the adjacent channels is inversely proportional to $\Delta L$.

For our designed cases, some of the MZI arms need to be highly asymmetric, i.e., require a large $\Delta L$. A large $\Delta L$ usually requires a long device, especially for weakly guided waveguides, such as the SOI. For such a weakly guided waveguide, the required bending radius is relatively large and a limited amount of length asymmetry can be achieved. Furthermore, a large chip area is needed in this way. An alternative way to avoid large length asymmetry is to create asymmetry in the effective refractive index. It is proposed that a periodic segment waveguide is used for replacing the straight arm so as to deliberately make the effective refractive indices of the two arms asymmetric. Therefore, the length difference of the two arms of the Mach-Zehnder interferometer is not necessary great, and the required function of the wavelength filtering can still be achieved. It is advantageous that the bending loss is reduced and the length of the device is shortened.

After leading the periodic segment waveguide into the equations, the equations (1), (2) of the Mach-Zehnder interferometer can be modified as follows:

$$P_{O1}=P_1 \sin^2(\pi(n_s+\eta\Delta n)\Delta L/\lambda_0)+P_2 \cos^2(\pi(n_s+\eta\Delta n)\Delta L/\lambda_0), \quad (3)$$

$$P_{O2}=P_1 \cos^2(\pi(n_s+\eta\Delta n)\Delta L/\lambda_0)+P_2 \sin^2(\pi(n_s+\eta\Delta n)\Delta L/\lambda_0). \quad (4)$$

Figure 6:
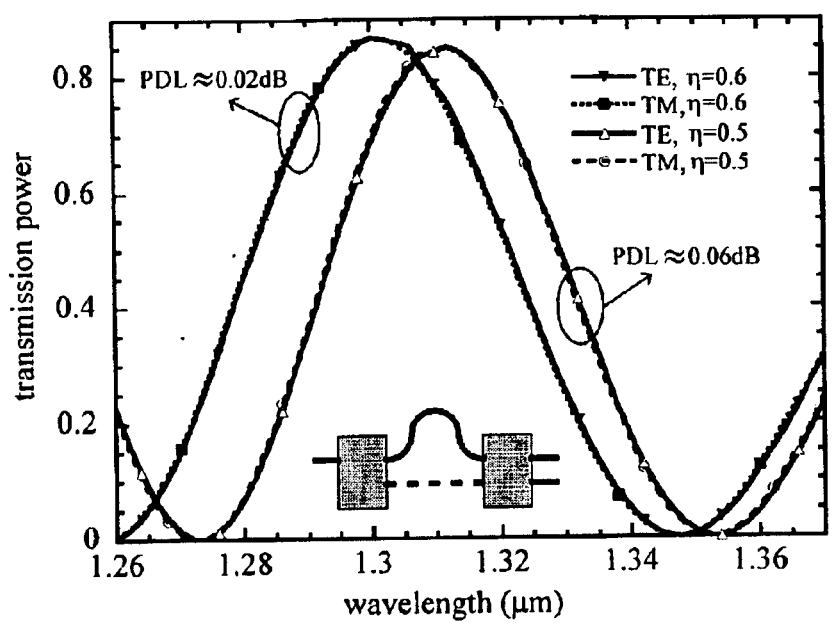
FIG. 6 is a statistic diagram of the light transmission characteristics of the two port Mach-Zehnder interferometer.

FIG. 6 shows the light transmission characteristic of the two port Mach-Zehnder interferometer. This element is composed of two 3-dB MMI beam splitters 30 and one periodic segment waveguide straight arm 10. The simulated result shows that the loss caused by the polarization of the incident light is very small (less that 0.1 dB), even when the duty cycle is changed.

Figure 7:
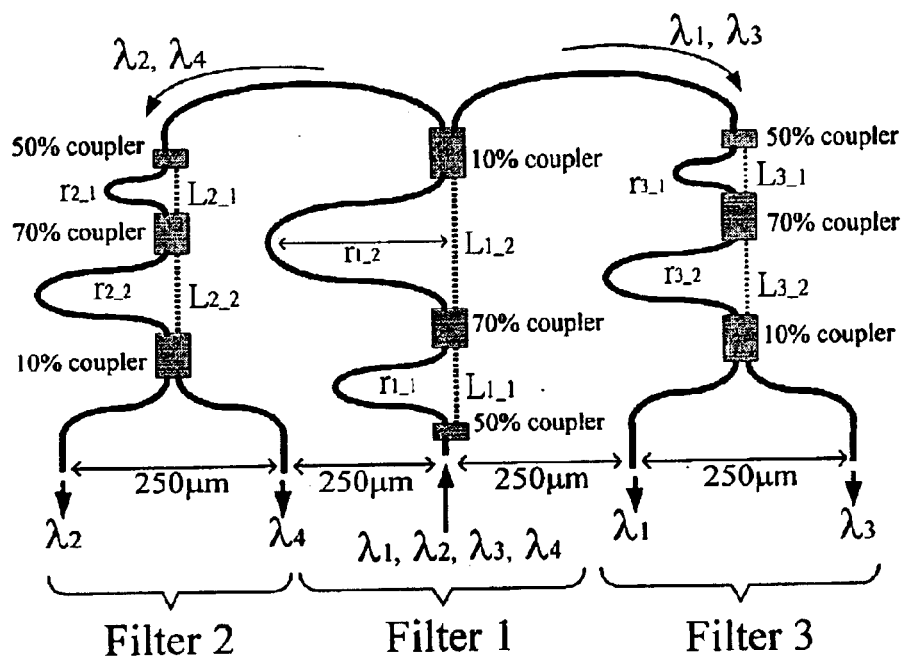
FIG. 7 is a perspective diagram of a four-channel coarse wavelength division demultiplexer according to the present invention.

FIG. 7 is a perspective diagram of a four-channel coarse wavelength division demultiplexer according to the present invention. In the present invention, the improved structure of the Mach-Zehnder interferometer is used for constructing the four-channel coarse wavelength division demultiplexer on the SOI waveguide material. This improved structure of the Mach-Zehnder interferometer is combined by the periodic segment waveguide and the arbitrary ratio MMI beam splitter. It is suitable to be applied in metro and access network, because it is easily fabricated, and it has a low cost, a small size and excellent output efficiency.

Figure 8:
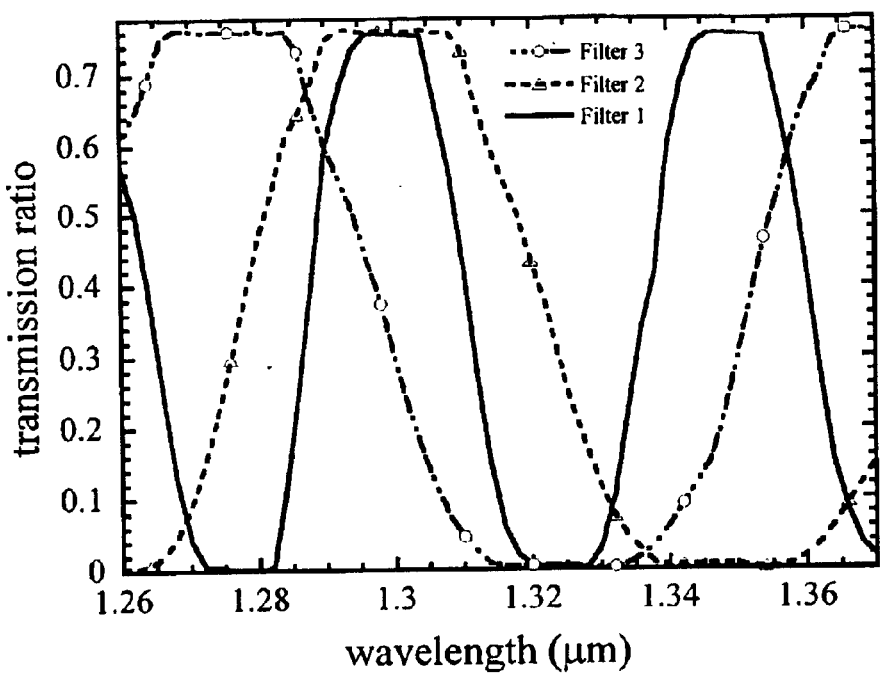
FIG. 8 is a statistic diagram of the light transmission characteristics of an improved structure of a Mach-Zehnder wavelength filter according to the present invention.

This four-channel coarse wavelength division demultiplexer is composed of three filters. To broaden the passband, each filter is designed to have a two-stage lattice-form improved MZI structure that consists of one 50% coupler, one 70% coupler, one 10% coupler, delay lines, and PSW arms. FIG. 8 is a statistic diagram of the light transmission characteristics of an improved structure of a Mach-Zehnder wavelength filter according to the present invention. The wavelength channel spacing is 24.5 nm, and it can be applied in the 10 GbE and the metro access network. The central wavelengths of the four channels are 1275.7 nm, 1300.2 nm, 1324.7 nm and 1349.2 nm, separately.

Figure 9:
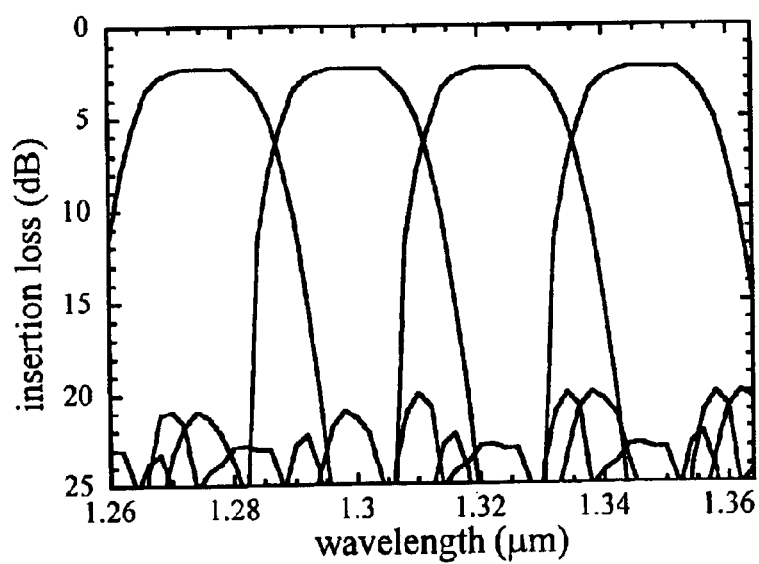
FIG. 9 is a statistic diagram of the output characteristics of the four-channel coarse wavelength division demultiplexer.

FIG. 9 is a statistic diagram of the output characteristics of the four-channel coarse wavelength division demultiplexer. As shown in the figure, the channel of the wavelength division demultiplexer has the insertion loss less than 2.3 dB, and the crosstalk larger than 18 dB. The 1 dB bandwidth of 18 nm was obtained to provide good tolerance on wavelength variation, and the 18 dB stop-band width is 12 nm.

The optical passive component employed in the present invention is not limited to the coarse wavelength division demultiplexer. The wavelength filter, the optical switch and the optical add-drop multiplexer also can be applied in the invention so as to shorten the dimension of the device, to reduce the bending loss and promote the tolerance to the fabrication error.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An improved structure of a Mach-Zehnder interferometer comprising:
    at least two multi-mode interfering beam splitters, wherein each of the multi-mode interfering beam splitters comprising:
    at least two input ports;
    at least two output ports; and
    a multi-mode interfering wave guide mother-area, wherein the multi-mode interfering wave guide mother-area is divided into a plurality of multi-mode interfering wave guide sub-areas, wherein the at least one multi-mode interfering wave guide sub-area is a first periodic segment wave guide having a plurality of segments;
    a curved arm connected to the output end and the input end between the multi-mode interfering beam splitters and the curved arm is a curved channel wave guide; and
    an straight arm connected to the other output end and the other input port between the multi-mode interfering beam splitters and the straight arm is a second periodic segment wave guide.

2. The improved structure of claim 1, wherein the first periodic segment waveguide is made of the material with the propagation loss lower than 0.2 dB.

3. The improved structure of claim 2, wherein the material with low propagation loss is the silica.

4. The improved structure of claim 2, wherein the material with low propagation loss is a silicon on insulator (SOI).

5. The improved structure of claim 1, wherein the second periodic segment waveguide is made of the material with the propagation loss lower than 0.2 dB.

6. The improved structure of claim 5, wherein the material with low propagation loss is a silicon on insulator (SOI).

7. The improved structure of claim 3, wherein the material with low propagation loss is the silica.

8. The improved structure of claim 1, wherein the beam-splitting ratio of the multi-mode interfering beam splitter is adjusted by changing the number of the segment of the first periodic segment waveguide.

9. The improved structure of claim 1, wherein the second periodic segment waveguide of the straight arm is a periodic block waveguide with a adjustable effective refraction index.

10. The improved structure of claim 9, wherein the length of the straight arm is reduced by setting the difference value of the effective refraction index of the second periodic segment waveguide.

11. The improved structure of claim 10, wherein the effective refraction index of the periodic segment wave guide is obtained by multiplying a ratio constant and the difference of an effective refraction rate and then adding an equivalent base refraction index.

12. The improved structure of claim 9, wherein the effective refraction index of the periodic segment wave guide is obtained by multiplying a ratio constant and the difference of an effective refraction rate and then adding an equivalent base refraction index.

13. The improved structure of claim 1, wherein the effective refraction index of the periodic segment wave guide is obtained by multiplying a ratio constant and the difference of an effective refraction rate and then adding an equivalent base refraction index.

14. A constructing method for an optical passive component by using the improved structure of the Mach-Zehnder interferometer of claim 1, the method comprising:
    providing an optical passive component;
    providing an improved structure of a Mach-Zehnder interferometer; and
    constructing the optical passive component by using the improved structure of the Mach-Zehnder interferometer.

15. The method of claim 14, wherein the optical passive component is a coarse wavelength division de-multiplexer (CWDM).

16. The method of claim 14, wherein the optical passive component is a wavelength filter.

17. The method of claim 14, wherein the optical passive component is an optical switch.

18. The method of claim 14, wherein the optical passive component is an optical add-drop multiplexer (OADM).

* * * * *